(12) United States Patent
Kim (10) Patent No.: US 11,905,866 B2
(45) Date of Patent: Feb. 20, 2024

(54) METHOD OF CONTROLLING REGENERATION OF PF FOR VEHICLE

(71) Applicants: Hyundai Motor Company, Seoul (KR); Kia Corporation, Seoul (KR)

(72) Inventor: Jin Ha Kim, Gunpo-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/840,466

(22) Filed: Jun. 14, 2022

(65) Prior Publication Data

US 2023/0024706 A1 Jan. 26, 2023

(30) Foreign Application Priority Data

Jul. 22, 2021 (KR) .................. 10-2021-0096516

(51) Int. Cl.
*F01N 3/00* (2006.01)
*F01N 3/023* (2006.01)
(Continued)

(52) U.S. Cl.
CPC ............ *F01N 3/023* (2013.01); *F01N 11/002* (2013.01); *F01N 11/007* (2013.01); *G07C 5/04* (2013.01); *F01N 2550/04* (2013.01)

(58) Field of Classification Search
CPC ...... F01N 3/023; F01N 11/002; F01N 11/007; F01N 2550/04; F01N 2550/00; F01N 2560/05; F01N 2560/08; F01N 2900/10; F01N 2900/1402; F01N 2900/1406; F01N 2900/1411; F01N 2900/1602;
(Continued)

(56) References Cited

U.S. PATENT DOCUMENTS

2006/0096280 A1* 5/2006 Zhan ............... F02D 41/029
60/297
2006/0179826 A1* 8/2006 Kuboshima .......... F01N 11/002
60/288

(Continued)

FOREIGN PATENT DOCUMENTS

EP          2402569 A1    1/2012
KR      20080055044 A  *  6/2008
(Continued)

*Primary Examiner* — Matthew T Largi
(74) *Attorney, Agent, or Firm* — MORGAN, LEWIS & BOCKIUS LLP (57) ABSTRACT

A method includes calculating whether a quantity of the PMs accumulated in a PF is at or above a risk level at which damage to the PF is caused when regenerating the PF, calculating a driving condition index by accumulating a weighting factor for a driving condition under which there is a likelihood of causing the damage to the PF, when the amount of accumulated PMs is at or above the risk level; calculating a temperature index in accordance with a temperature of the PF and a PM index in accordance with the quantity of the accumulated PMs when the quantity of the accumulated PMs is at or above the risk level; calculating a degradation condition index considering the driving condition index, the temperature of the PF, and the quantity of accumulated PMs; and changing a regeneration period of the PF according to the degradation condition index.

16 Claims, 7 Drawing Sheets

(51) Int. Cl.
*F01N 11/00* (2006.01)
*G07C 5/04* (2006.01)

(58) Field of Classification Search
CPC .. F01N 2900/1606; F01N 9/005; F01N 11/00; F01N 9/002; G07C 5/04
See application file for complete search history.

(56) References Cited

U.S. PATENT DOCUMENTS

| | | | |
|---|---|---|---|
| 2007/0056273 A1* | 3/2007 | Wills | F01N 9/002 60/285 |
| 2007/0193258 A1* | 8/2007 | Berke | F01N 9/002 60/285 |
| 2008/0016856 A1* | 1/2008 | Zhang | F02D 41/029 60/285 |
| 2009/0188243 A1* | 7/2009 | Williams | F01N 9/002 60/274 |
| 2013/0061573 A1* | 3/2013 | In | F02D 41/029 60/274 |
| 2016/0053648 A1* | 2/2016 | Iojoiu | F01N 3/027 60/297 |
| 2017/0107919 A1* | 4/2017 | Kim | F02D 41/2451 |
| 2017/0159596 A1* | 6/2017 | Kim | F02D 41/3005 |
| 2019/0353066 A1* | 11/2019 | Paukner | F01N 3/021 |

FOREIGN PATENT DOCUMENTS

| | | | |
|---|---|---|---|
| KR | 10-2017-0048806 A | | 5/2017 |
| KR | 20170048806 A | * | 5/2017 |
| KR | 10-2018-0070749 | | 6/2018 |
| WO | WO2017-006511 A1 | | 1/2017 |

\* cited by examiner

| vehicle driving condition / number of times of excess | 0 | 1 | 2 | 3 | 4 | 5 | 6 |
|---|---|---|---|---|---|---|---|
| 0 | 0 | 0 | 0 | 0 | 0 | 0 | 0 |
| 5 | 0 | 0.004 | 0.004 | 0.004 | 0 | 0 | 0 |
| 10 | 0 | 0.008 | 0.008 | 0.008 | 0 | 0 | 0 |
| 15 | 0 | 0.012 | 0.012 | 0.012 | 0 | 0 | 0 |
| 20 | 0 | 0.016 | 0.016 | 0.016 | 0 | 0 | 0 |

METHOD OF CONTROLLING REGENERATION OF PF FOR VEHICLE

CROSS REFERENCE TO RELATED APPLICATION

The present application claims priority to Korean Patent Application No. 10-2021-0096516, filed Jul. 22, 2021, the entire contents of which is incorporated herein for all purposes by this reference.

BACKGROUND OF THE PRESENT DISCLOSURE

Field of the Present Disclosure

The present disclosure relates to a technology for regenerating a particulate filter for a vehicle.

Description of Related Art

A diesel particulate filter (DPF) which is a type of PF collects particulate matters (PMs) ejected from a diesel engine and thus prevents the PMs from being discharged into the atmosphere. The accumulated PMs are combusted through a regeneration process.

When regenerating the PF as described above, a too-large quantity of the PMs accumulated in the PF or a too-high temperature of the PF causes damage to the PF. Thus, a suitable technology for regenerating the PF is necessary.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling regeneration of a PF for a vehicle, the method configured for predicting the likelihood of degrading a PF and thus suitably regenerating the PF. With the method, the PF may be prevented from being degraded, and exhaust fumes due to the degradation of the PF may be prevented from being discharged. Furthermore, vehicle repair expenses may be saved.

According to various aspects of the present disclosure, there is a method of controlling regeneration of a PF for a vehicle, the method including: determining whether a quantity of the PMs accumulated in a PF is at or above a risk level at which damage to the PF is caused when regenerating the PF, the quantity thereof being in accordance with a sensor-measured value; calculating a driving condition index by accumulating a weighting factor for a driving condition under which there is a likelihood of causing the damage to the PF, based on an amount of exhaust gas flowing from an engine and a concentration of oxygen in the exhaust gas when an amount of the accumulated PMs is at or above the risk level at which the damage to the PF is caused; calculating a degradation condition index considering the driving condition index, a temperature of the PF and the quantity of the PMs accumulated in the PF; and changing a regeneration period of the PF according to the degradation condition index.

In the method, in the calculating of the driving condition index, a weighting factor for a current driving condition may be calculated from a map for a weighting factor for the amount of the flowing exhaust gas and the concentration of the oxygen, and the operation condition index may be calculated by accumulating the weighting factor.

In the method, the higher the likelihood of causing the damage to the PF is than a predetermined designed target, the greater positive number the weighting factor may be set to, and the lower the likelihood of causing the damage to the PF is than the predetermined designed target, the smaller negative number the weighting factor may be set to.

In the method, in the calculating of the driving condition index, the driving condition index may always be set to be calculated as zero or greater than the zero.

In the method, when the weighting factor is zero or greater than the zero, or when an absolute value of the weighting factor is equal to or lower than a current operation condition index, the weighting factor may be added to the operation condition index, and when the weighting factor is a negative value and when the absolute value of the weighting factor is higher than the current operation condition index, the operation condition index may be set to zero.

In the method, when the quantity of the PMs accumulated in the PF is at or above a predetermined first PM reference value, the quantity thereof being in accordance with the sensor-measured value, it may be determined that the quantity of the PMs accumulated in the PF is at or above the risk level at which the damage to the PF is caused when regenerating the PF.

In the method, the determining, the calculating, and the changing may be ended when the quantity of the PMs accumulated in the PF is at or below a second PM reference value which is a value lower than the first PM reference value and is set to a level at which there is no likelihood of causing the damage to the PF when regenerating the PF.

In the method, in the changing of the regeneration period of the PF, the degradation condition index may be adjusted such that, the higher the degradation condition index, the more increased the quantity of the PMs accumulated in the PM, and thus the regeneration period of the PF may be shortened.

In the method, the changing of the regeneration period of the PF may include: comparing the degradation condition index with a predetermined reference index value; counting up a number of times of excess when the degradation condition index is higher than the predetermined reference index value; and adjusting the quantity of the PMs accumulated in the PF according to the number of times of excess and a predetermined vehicle driving condition to increase the quantity of the PMs accumulated in the PF after counting up the number of times of excess.

In the method, when the degradation condition index is equal to or lower than the predetermined reference index value, the regeneration period of the PF may be prevented from being kept shortened, considering a situation where PF regeneration is normally completed.

In the method, the changing of the regeneration period of the PF may further include: counting up a number of times of non-excess when the degradation condition index is equal to or lower than the predetermined reference index value and when the PF regeneration is normally completed; and initializing each of the number of times of excess and the number of times of non-excess to zero when the number of times of non-excess is greater than a predetermined reference number of times after the counting up the number of times of non-excess.

In the method, when the degradation condition index is higher than the predetermined reference index value, the number of times of excess may be counted up and the number of times of non-excess may be initialized to zero.

In the method, in the calculating of the degradation condition index, the degradation condition index may be calculated using a TNS index in accordance with the temperature of the PF and the quantity of the PMs accumulated in the PF and the driving condition index.

According to an exemplary embodiment of the present disclosure, the likelihood of degrading the PF may be predicted, and thus the PF regeneration may be suitably performed. Accordingly, the PF may be prevented from being degraded, and the exhaust fumes due to the degradation of the PF may be prevented from being discharged. Furthermore, vehicle repair expenses may be saved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

For illustrative purpose only, embodiments of the present disclosure disclosed herein will be described in terms of specific structures and functions. The exemplary embodiments of the present disclosure may be implemented in various ways and therefore should not be construed as limiting the present disclosure.

Various modifications may be made in various ways to the exemplary embodiments of the present disclosure. Therefore, specific embodiments will be described in detail below with reference to the accompanying drawings. However, the present description is not intended to limit the technical idea of the present disclosure to the specifically disclosed exemplary embodiments of the present disclosure. All alterations, equivalents, and substitutes that are included within the technical idea of the present disclosure should be understood as falling within the scope of the present disclosure.

The terms first, second, and the like may be used to describe various constituent elements but should not limit these constituent elements. Those terms are only used to distinguish one constituent element from another. For example, a first constituent element may be termed a second constituent element without departing from the scope of each claim that defines the present disclosure. Likewise, the second constituent element may also be termed the first constituent element.

It should be understood that, when a constituent element is referred to as being "coupled to" or "connected to" a different constituent element, this means that the constituent element may be coupled to or connected to the different constituent element or means that an intervening constituent element may be present therebetween. In contrast, it should be understood that, when a constituent element is referred to as being "directly coupled to" or "directly connected to" a different constituent element, this means that no intervening constituent element is present therebetween. This is true for expressions describing a relationship between constituent elements. For example, expressions such as "between" and "directly between" and expressions such as "adjacent to" and "directly adjacent to" should also be construed in the same manner.

The terms used herein are only for describing specific embodiments and are not intended to limit the present disclosure. The indefinite article "a/an" is used to mean one or more, not only one, except as distinctively expressed in context. It should be understood that, throughout the exemplary embodiment, the term "include," "have," or the like is directed to indicate that a feature, a number, a step, an operation, a constituent element, a component, or any combination thereof is present, without precluding the presence or addition of one or more other features, numbers, steps, operations, constituent elements, or any combination thereof.

Unless otherwise defined, each of all terms used throughout the exemplary embodiment, including technical or scientific terms, has the same meaning as is normally understood by a person of ordinary skill in the art to which an exemplary embodiment of the present disclosure pertains. The term as defined in commonly used dictionaries should be construed as having the same contextual meaning as that in the related art, and unless otherwise explicitly defined in the exemplary embodiment, should not be construed as having an excessively implied meaning or a purely literal meaning.

Desired embodiments of the present disclosure will be described in detail below with reference to the accompanying drawings. The same reference character on the drawings refers to the same constituent element.

Figure 1:
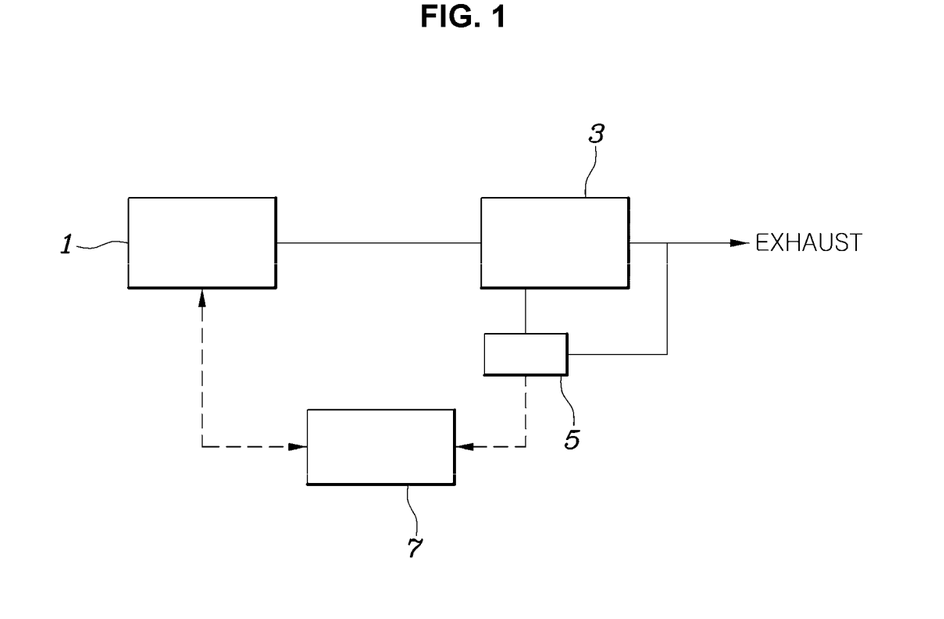
FIG. 1 is a view exemplarily illustrating an engine system to which a method of controlling regeneration of a PF for a vehicle according to an exemplary embodiment of the present disclosure is applicable.

A configuration of an engine system in which an exemplary embodiment of the present disclosure may find application is described with reference to FIG. 1. Exhaust gas ejected from an engine 1 passes through a PF 3. Accordingly, the exhaust gas from which PMs are filtered out by the PF 3 is discharged into the atmosphere. A differential pressure sensor 5 is mounted in the PF 3. With a signal of the differential pressure sensor 5, a controller 7 determines a quantity of the PMs accumulated in the PF 3. The engine 1 is accordingly controlled.

For reference, the controller 7, as described above, calculates a quantity of accumulated PMs, based on a value measured by the differential pressure sensor 5, and calculates a quantity of the PMs accumulated in the PF 3 using a preset model. Accordingly, the controller 7 controls regeneration of the PF 3 using these two quantities of PMs accumulated in the PF 3: one in accordance with a sensor-measured value; and the other one resulting from model estimation.

For example, the regeneration of the PF 3 is performed based on the greater of respective values of the quantity of accumulated PMs which is in accordance with the sensor-measured pressure value and the quantity of accumulated PMs that results from the model estimation.

Figure 2:
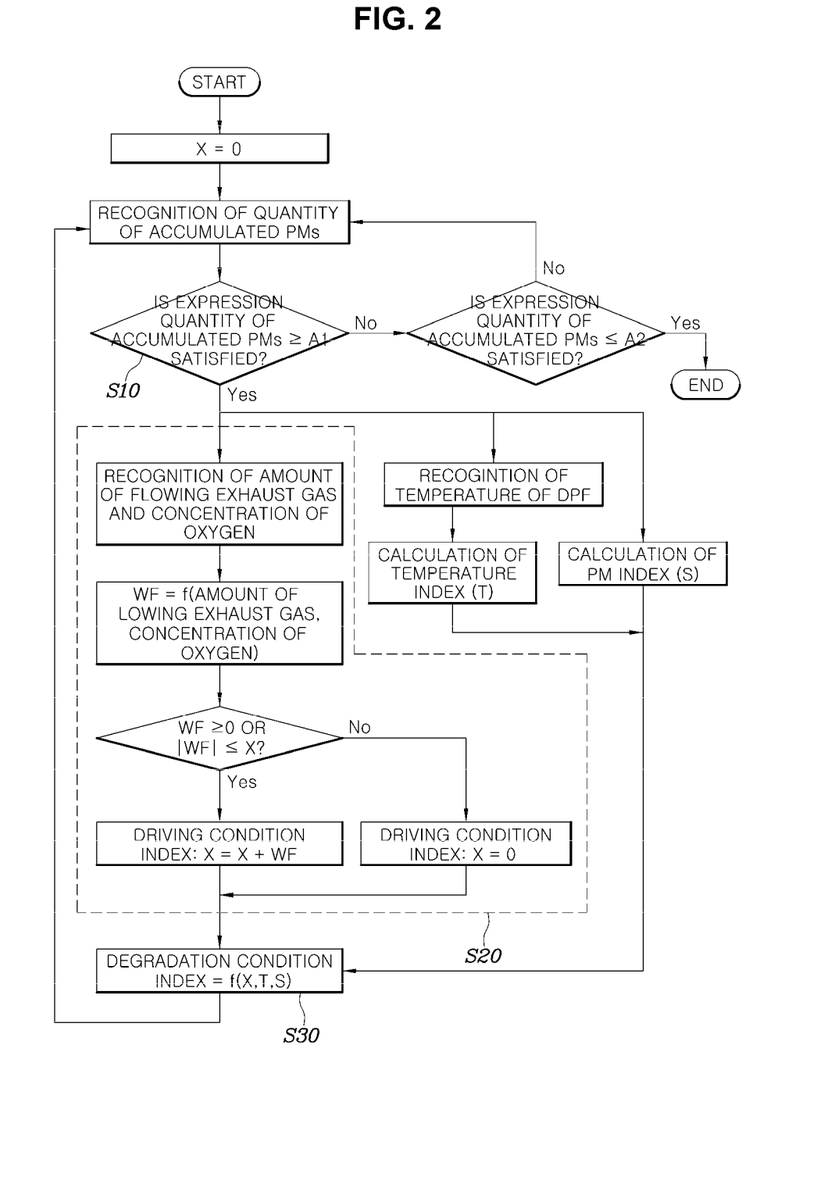
FIG. 2 and FIG. 3 are flowcharts each illustrating a method of controlling regeneration of a PF for a vehicle according to various exemplary embodiments of the present disclosure.
Figure 3:
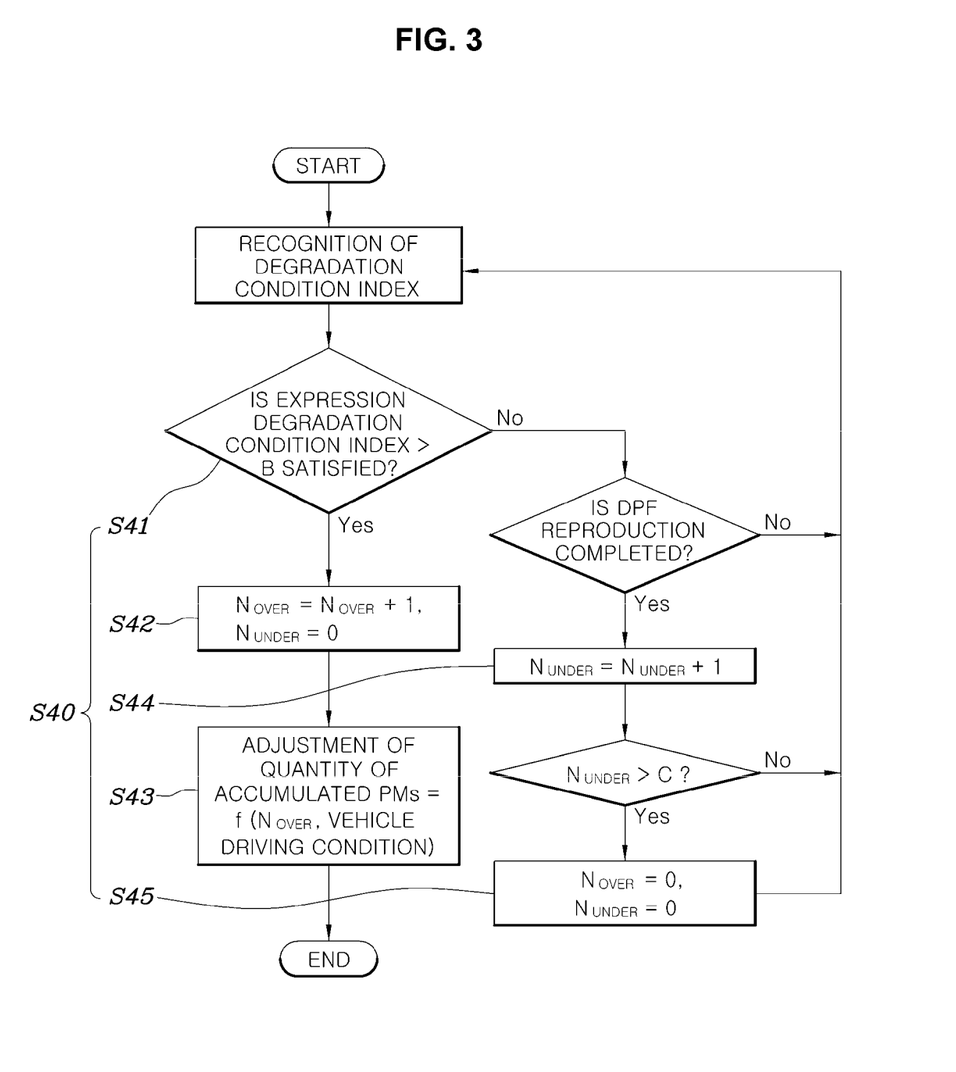

With reference to FIG. 2 and FIG. 3, a method of controlling regeneration of a PF for a vehicle according to an exemplary embodiment of the present disclosure includes: a step S10 of whether or not a quantity of the PMs accumulated in a PF is at or above a risk level at which damage to the PF is caused when regenerating the PF, the quantity thereof being in accordance with a sensor-measured value; a step S20 of calculating a driving condition index X by accumulating a weighting factor for a driving condition under which there is a likelihood of causing damage to the PF, based on an amount of exhaust gas flowing from an engine and a concentration of oxygen in the exhaust gas, when an amount of the accumulated PMs is at or above the risk level at which the damage to the PF is caused; Step S30 of calculating a degradation condition index considering the driving condition index X, a temperature of the PF and the quantity of the PMs accumulated in the PF; and Step S40 of changing a regeneration period of the PF according to the degradation condition index.

That is, according to an exemplary embodiment of the present disclosure, when the quantity of accumulated PMs which is at a level at which there is the likelihood of causing the damage to the PF when regenerating the PF is measured, the driving condition for the engine under which there is the likelihood of causing the damage to the PF is considered as the driving condition index X using a weighting factor in accordance with the amount of the flowing exhaust gas and the concentration of the oxygen. Furthermore, the temperature of the PF and the quantity of accumulated PMs are considered. The degradation condition index is calculated based on these considerations. Thus, the likelihood of degrading the PF is quantified. A regeneration period of the PF is changed based on the present quantification. Consequently, the PF is prevented from being degraded.

When the quantity of the PMs accumulated in the PF is at or above a predetermined first PM reference value A1, the quantity thereof being in accordance with the senor-measured value, the controller 7 may determine that the quantity of accumulated PMs is at or above the risk level at which the damage to the PF is caused when regenerating the PF.

The first PM reference value A1 here, as described above, is set to serve as a value based on which it is determined whether there is the likelihood of causing the damage to the PF when regenerating the PF. The first PM reference value A1 may be determined through many experiments and analyses during a design stage, and for example, may be set to 50 gram.

In Step S20 of calculating the driving condition index X, a weighting factor for a current driving condition is calculated from a map for the weighting factor in accordance with the amount of the flowing exhaust gas and the concentration of the oxygen. Accordingly, the driving condition index X is calculated by accumulating the weighting factor.

The higher the likelihood of causing the damage to the PF is than a predetermined designed target, the greater positive number the weighting factor is set to, and the lower the likelihood of causing the damage to the PF is than the predetermined designed target, the smaller negative number the weighting factor is set to.

That is, the more the driving condition determined by the amount of the flowing exhaust gas and the concentration of the oxygen increases the likelihood of causing the damage to the PF, the greater positive number the weighting factor is set to.

The predetermined designed target may mean a normal level of the PF below which the damage to the PF is caused when normally regenerating the PF. Therefore, when it is determined that the amount of the flowing exhaust gas and the concentration of the oxygen cause the PF at the normal level to be damaged when regenerating the PF, the weighting factor may be set to zero.

Of course, according to a designer's intention, the designed target may be set in such a manner to somewhat raise or lower the normal level of the PF below which the damage the PF is caused when normally regenerating the PF.

Figure 4:
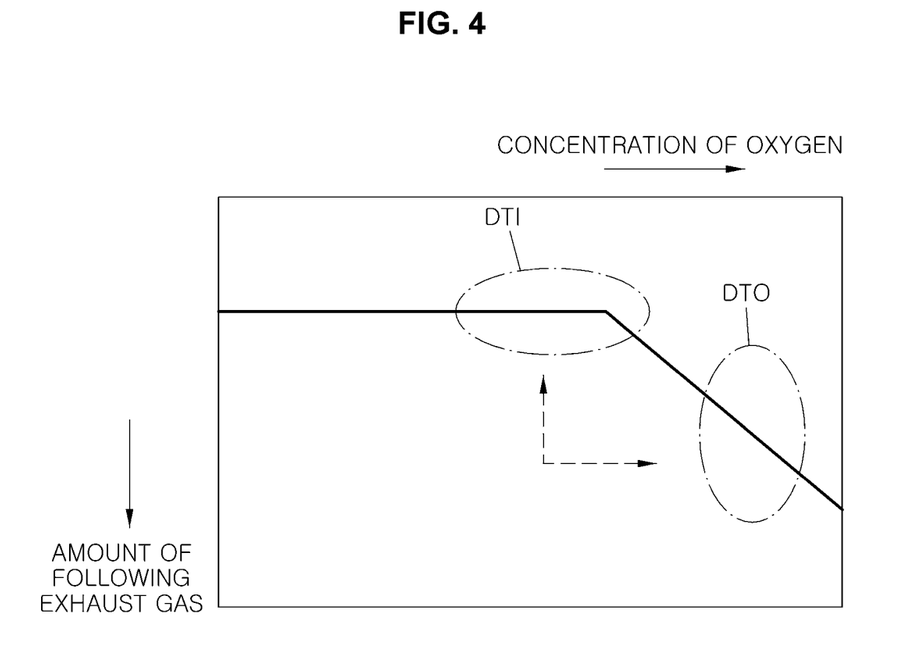
FIG. 4 is a view exemplarily illustrating a map for a weight factor in accordance with a concentration of oxygen and an amount of flowing exhaust gas.

The map for the weighting factor in accordance with the amount of the flowing exhaust gas and the concentration of the oxygen may be configured as illustrated in FIG. 4. In FIG. 4, a straight line represents a weighting factor value of 0. The weighting factor value tends to be gradually increased in a direction indicated by a dotted line arrow.

For reference, a drop-to-idle (DTI) region and a drop-to-overrun (DTO) region, as illustrated in FIG. 4, may be included.

In Step S20 of calculating the driving condition index X, the driving condition index is always set in such a manner to be calculated as zero or greater than the zero.

In an exemplary embodiment of the present disclosure, when the weighting factor is equal to or greater than zero, or when an absolute value of the weighting value is equal to or lower than the current driving condition index X, the weighting factor is added to the driving condition index X. When the weighting factor is a negative number and when the absolute value of the weighting factor is higher than the current driving condition index X, the driving condition index X is set to zero. Thus, the driving condition index X is always set to be calculated as zero or greater than the zero.

As described below, the greater value the driving condition index X has, the more shortened the regeneration period of the PF. Furthermore, the smaller valve the driving condition index X has, the more lengthened the regeneration period of the PF.

Therefore, when the driving condition index X is set to smaller than zero, the regeneration period of the PF is lengthened. Thus, a situation where combustion of an excessive quantity of PMs in the PF facilitates degradation of the PF may occur when regenerating the PF. For the present situation not to occur from the beginning, the driving condition index X is always set to be calculated set to zero or greater.

In Step S30 of calculating the degradation condition index, as described above, the degradation condition index is calculated according to the driving condition index X, the temperature of the PF, and the quantity of accumulated PMs.

The temperature of the PF and the quantity of accumulated PMs, as illustrated in FIG. 2, may be converted into a temperature index T and a PM index S, respectively, and thus the resulting temperature index T and PM index X may be used. In the instant case, the temperature index T may be set in such a manner to be in proportion to the temperature of the PM, and the PM index S may also be set in such a manner to be in proportion to the quantity of PMs accumulated.

Figure 5:
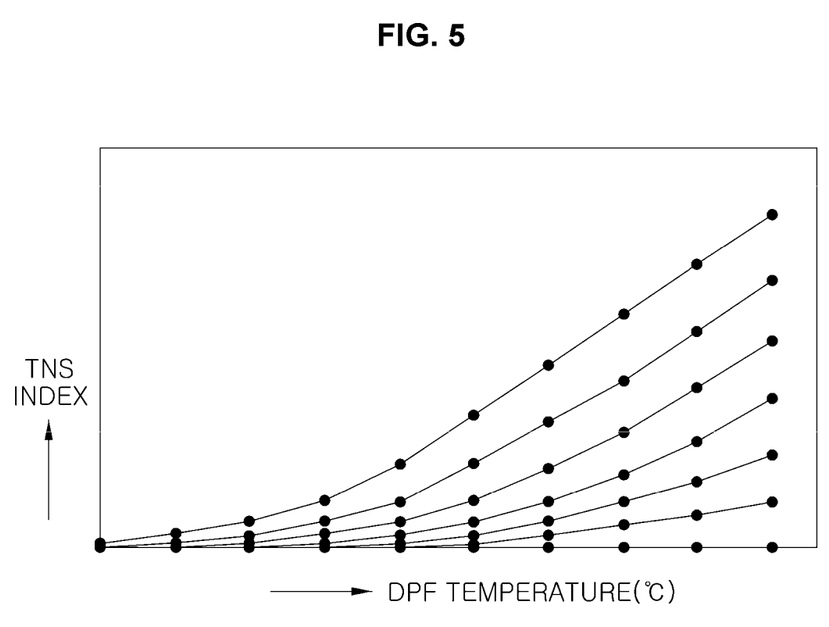
FIG. 5 is a view exemplarily illustrating a map for a TNS index in accordance with a quantity of the PMs accumulated in a PF and a temperature of the PF.

The temperature of the PF and the quantity of the PMs accumulated in the PF, as illustrated in FIG. 5, may be replaced with a TNS index, and the resulting TNS index may be used.

That is, regarding the determination of the degradation condition index, the degradation condition index is calculated using the TNS index in accordance with the temperature of the PF and the quantity of the PMs accumulated in the PF and the driving condition index X.

In FIG. 5, each curve represents the quantity of accumulated PMs. The more upward positioned the curve, the more quantity of accumulated PMs the curve represents. The TNS index on the vertical axis is determined by the temperature of the PF on the horizontal axis and the curve representing the quantity of accumulated PMs.

The advantage of using the TNS index is that an influence that the temperature of the PF and the quantity of accumulated PMs exert on the degradation of the PF together as well as individually may be considered.

Figure 6:
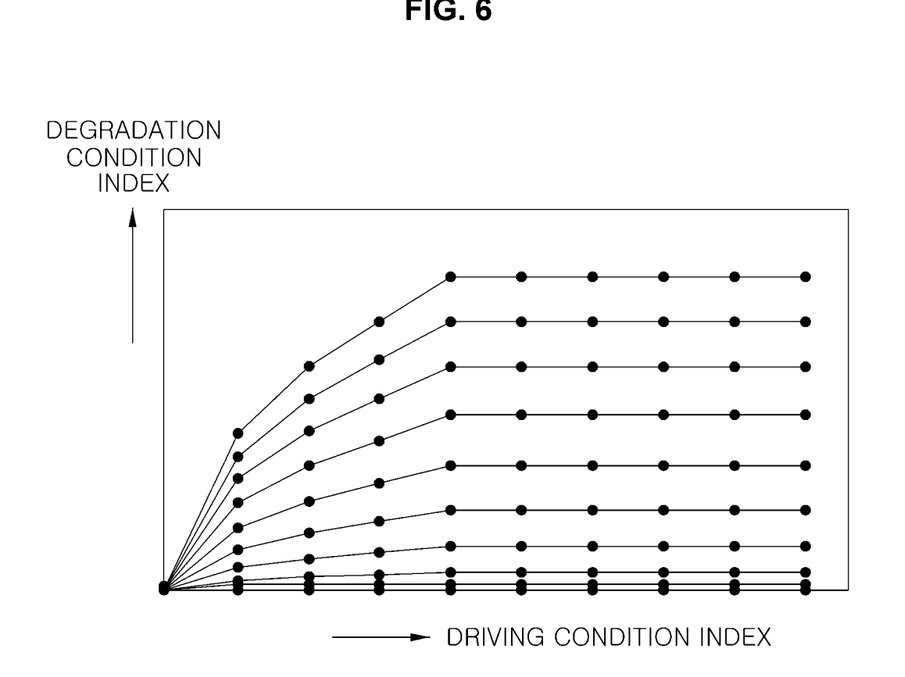
FIG. 6 is a view exemplarily illustrating a map for degradation condition index in accordance with a driving condition index and the TNS index.

FIG. 6 illustrates a map for determining the degradation condition index using a TNS curve as determined as described above and the driving condition index X on the horizontal axis.

Of course, the more upward positioned the TNS curve, the higher TNS index the TNS curve represents.

In FIG. 3. in Step S40 of changing the regeneration period of the PF according to the degradation condition index, the degradation condition index is adjusted such that, the higher the degradation condition index, the more increased the quantity of the PMs accumulated in the PF, and thus the period of the P may be shortened.

That is, Step S40 of changing the regeneration period of the PF according to the degradation condition index may include Step S41 of comparing the degradation condition index with a predetermined reference index value B; Step S42 of counting up the number of times of excess $N_{OVER}$, when the degradation condition index is higher than the reference index value B; and Step S43 of adjusting the quantity of the PMs accumulated in the PF according to the number of times of excess $N_{OVER}$ and a predetermined vehicle driving condition to increase the quantity of the PMs accumulated in the PF after counting up the number of times of excess $N_{OVER}$.

The reference index value B may be set such that, as a result of comparing the degradation condition index with the reference index value B, it is determined that the likelihood of degrading the PF is comparatively high. For example, the reference index value B may be set to a number such as 5.

As described above, the number of times that the degradation condition index exceeds the reference index value B is counted up as the number of times of excess $N_{OVER}$. When an adjustment is made for the increase in the quantity of the PMs accumulated in the PF according to the number of times of excess $N_{OVER}$ and the vehicle driving condition, the controller 7, responsible for determining a point in time at which the PF is regenerated, consequently starts to reproduce the PF earlier according to the increased quantity of the PMs accumulated in the PF than before. Accordingly, the PF is regenerated in a state where a relatively less quantity of PMs is accumulated in the PF. Thus, the likelihood of degrading the PF is further decreased.

Figure 7:
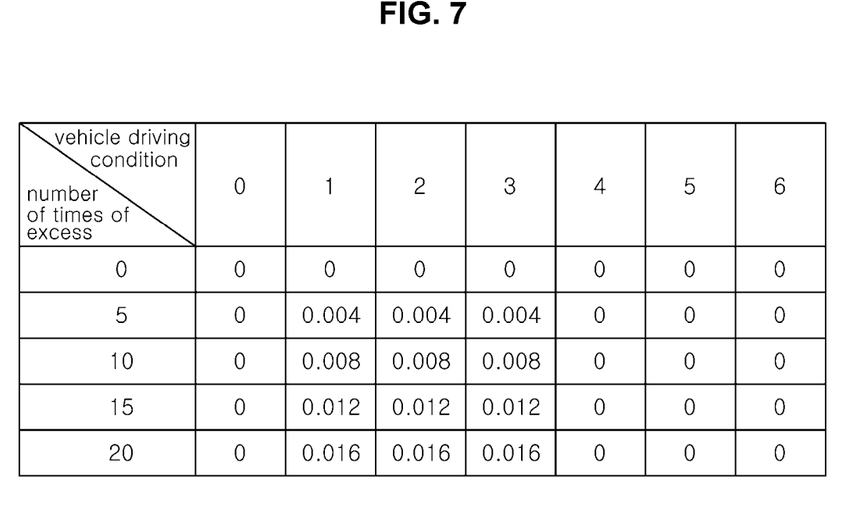
FIG. 7 is a table illustrating a map for an additional quantity of accumulated PMs which is in accordance with the number of times of excess and a vehicle driving condition.

The quantity of the PMs accumulated in the PF according to the number of times of excess $N_{OVER}$ and the vehicle driving condition may be adjusted, using, for example, a map for an additional quantity of accumulated PMs which is in accordance with the number of times of excess $N_{OVER}$ and the vehicle driving condition, as illustrated in FIG. 7.

A field of a table in FIG. 7 represents the vehicle driving condition made up of factors, such as an engine speed and an engine load, that influence the degradation of the PF when regenerating the PF. A record of the table in FIG. 7 represents the number of times of excess. Each field value indicates the additional quantity of accumulated PMs under the corresponding vehicle driving condition and in the case of the corresponding number of times of excess.

Therefore, for example, when the vehicle driving condition is 3 and where the number of times of excess $N_{OVER}$ is 10, the additional quantity of the accumulated PMs is 0.008 g/km. Accordingly, the controller 7 adds the present additional quantity of accumulated PMs to the quantity of the PMs accumulated in the PF that results from the model estimation, and thus determines the result of the present addition as the quantity of the PMs accumulated in the PF that results from new model estimation. Thus, the effect of substantially shortening the regeneration period of the PF may be achieved.

For reference, in FIG. 7, in most cases, when the engine load or the engine speed is low, an additional quantity of accumulated PMs is not zero. from the table, it may be seen that, when the number of times of excess is equal to or greater than a predetermined number of times of excess, a situation may occur where the quantity of the PMs accumulated in the PF occurs substantially frequently.

According to an exemplary embodiment of the present disclosure, when the degradation condition index is equal to or lower than the reference index value B, the regeneration period of the PF may be prevented from being kept shortened, considering a situation where PF regeneration is normally completed.

That is, as described above, after the regeneration period of the PF is shortened due to the increased number of times of excess $N_{OVER}$, when a situation continues where the degradation condition index falls below the reference index value B and where the PF regeneration is normally completed, there is a need to further maintain a state where the regeneration period of the PF is shortened as described above. For the present reason, according to an exemplary embodiment of the present disclosure, control is set to be initialized to be re-performed.

To the present end, in Step S40 of changing the regeneration period of the PF according to the degradation condition index may be configured to further include: Step S44 of counting up the number of times of non-excess $N_{UNDER}$ when the degradation condition index is equal to or lower than the reference index value B and when the PF regeneration is normally completed; and Step S45 of initializing each of the number of times of excess $N_{OVER}$ and the number of times of non-excess $N_{UNDER}$ to zero when the number of times of non-excess $N_{UNDER}$ is greater than a predetermined reference number of times C after counting up the number of times of non-excess $N_{UNDER}$.

That is, as described, when the degradation condition index is equal to or lower than the reference index value B and when the number of times of non-excess $N_{UNDER}$ into which the number of times that the PF regeneration is normally completed is converted is greater than the reference number of times C, the number of times of excess $N_{OVER}$ is initialized to zero. Consequently, the additional quantity of accumulated PMs is set not to be added to the quantity of accumulated PMs that results from the model estimation. Thus, the shortened regeneration period of the PF may be restored to an original state thereof.

According to the exemplary embodiment of the present disclosure, when the number of times of excess $N_{OVER}$ is counted up because the degradation condition index is higher than the reference index value B, the number of times of non-excess $N_{UNDER}$ is initialized to zero. Consequently, an unstable control state is avoided where shortening and restoring the regeneration period of the PF frequently occur.

According to the exemplary embodiment of the present disclosure, all the steps according to the exemplary embodiment may be ended when the quantity of the PMs accumulated in the PF that results from the model estimation is at or below a second PM reference value A2 which is a value lower than the first PM reference value A1 and is set to a level at which there is no likelihood of causing the damage to the PF when regenerating the PF.

Therefore, as in the above-described example, when the first PM reference value A1 is 50 g, the second PM reference value A2 may be set to, for example, 5 g.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling regeneration of a particulate filter (PF) for a vehicle, the method comprising:
    determining, by a controller, whether a quantity of particulate matters (PMs) accumulated in the PF is at or above a risk level at which damage to the PF is caused when regenerating the PF, the quantity thereof being in accordance with a sensor-measured value;
    calculating, by the controller, a driving condition index by accumulating a weighting factor for a driving condition under which there is a likelihood of causing the damage to the PF, based on an amount of exhaust gas flowing from an engine and a concentration of oxygen in the exhaust gas when the quantity of the accumulated PMs is at or above the risk level at which the damage to the PF is caused;

calculating, by the controller, a temperature index in accordance with a temperature of the PF and a PM index in accordance with the quantity of the accumulated PMs when the quantity of the accumulated PMs is at or above the risk level at which the damage to the PF is caused;

calculating, by the controller, a degradation condition index considering the driving condition index, the temperature of the PF and the quantity of the PMs accumulated in the PF; and changing, by the controller, a regeneration period of the PF according to the degradation condition index, wherein the degradation condition index is adjusted such that, the higher the degradation condition index, the more increased the quantity of the PMs accumulated in the PM, and thus the regeneration period of the PF is shortened.

2. The method of claim 1, wherein in the calculating of the driving condition index, a weighting factor for a current driving condition is calculated from a map for a weighting factor in accordance with the amount of the flowing exhaust gas and the concentration of the oxygen, and an operation condition index is calculated by accumulating the weighting factor.

3. The method of claim 2, wherein the higher the likelihood of causing the damage to the PF is than a predetermined designed target, the greater positive number the weighting factor is set to, and the lower the likelihood of causing the damage to the PF is than the predetermined designed target, the smaller negative number the weighting factor is set to.

4. The method of claim 3, wherein in the calculating of the driving condition index, the driving condition index is always set to be calculated as zero or greater than the zero.

5. The method of claim 4,
wherein when the weighting factor is zero or greater than the zero, or when an absolute value of the weighting factor is equal to or lower than a current operation condition index, the weighting factor is added to the operation condition index, and wherein when the weighting value is a negative number and when the absolute value of the weighting factor is higher than the current operation condition index, the operation condition index is set to zero.

6. The method of claim 1, wherein when the quantity of the PMs accumulated in the PF is at or above a predetermined first PM reference value, the quantity thereof being in accordance with the sensor-measured value, the controller concludes that the quantity of the PMs accumulated in the PF is at or above the risk level at which the damage to the PF is caused when regenerating the PF.

7. The method of claim 6, wherein the determining, the calculating, and the changing are ended when the quantity of the PMs accumulated in the PF is at or below a second PM reference value which is a value lower than the first PM reference value and is set to a level at which there is no likelihood of causing the damage to the PF when regenerating the PF.

8. The method of claim 1, wherein the changing of the regeneration period of the PF includes:

comparing the degradation condition index with a predetermined reference index value;

counting up a number of times of excess when the degradation condition index is higher than the predetermined reference index value; and adjusting the quantity of the PMs accumulated in the PF according to the number of times of excess and a predetermined vehicle driving condition to increase the quantity of the PMs accumulated in the PF after counting up the number of times of excess.

9. The method of claim 8, wherein when the degradation condition index is equal to or lower than the predetermined reference index value, the regeneration period of the PF is prevented from being kept shortened, considering a situation where PF regeneration is normally completed.

10. The method of claim 9, wherein the changing of the regeneration period of the PF further includes:

counting up a number of times of non-excess when the degradation condition index is equal to or lower than the predetermined reference index value and when the PF regeneration is normally completed; and initializing each of the number of times of excess and the number of times of non-excess to zero when the number of times of non-excess is greater than a predetermined reference number of times after the counting up the number of times of non-excess.

11. The method of claim 10, wherein when the degradation condition index is higher than the predetermined reference index value, the number of times of excess is counted up and the number of times of non-excess is initialized to zero.

12. The method of claim 1, wherein in the calculating of the degradation condition index, the degradation condition index is calculated using a Temperature and Soot (TNS) index in accordance with the temperature of the PF and the quantity of the PMs accumulated in the PF and the driving condition index.

13. A vehicle of controlling regeneration of a particulate filter (PF), the vehicle comprising:

an engine;

the PF connected to the engine, wherein exhaust gas ejected from the engine passes through the PF;

a sensor mounted in the PF; and a controller to determine a quantity of the particulate matters (PMs) accumulated in the PF, wherein the controller is configured for:

determining whether the quantity of PMs accumulated in the PF is at or above a risk level at which damage to the PF is caused when regenerating the PF, the quantity thereof being in accordance with a sensor-measured value;

calculating a driving condition index by accumulating a weighting factor for a driving condition under which there is a likelihood of causing the damage to the PF, based on an amount of exhaust gas flowing from the engine and a concentration of oxygen in the exhaust gas when the quantity of the accumulated PMs is at or above the risk level at which the damage to the PF is caused;

calculating a temperature index in accordance with a temperature of the PF and a PM index in accordance with the quantity of the accumulated PMs when the quantity of the accumulated PMs is at or above the risk level at which the damage to the PF is caused;

calculating a degradation condition index considering the driving condition index, the temperature of the PF and the quantity of the PMs accumulated in the PF; and changing a regeneration period of the PF according to the degradation condition index, wherein the degradation condition index is adjusted such that, the higher the degradation condition index, the more increased the quantity of the PMs accumulated in the PM, and thus the regeneration period of the PF is shortened.

14. The vehicle of claim 13, wherein in the calculating of the driving condition index, a weighting factor for a current driving condition is determined from a map for a weighting factor in accordance with the amount of the flowing exhaust gas and the concentration of the oxygen, and an operation condition index is determined by accumulating the weighting factor.

15. The vehicle of claim 13, wherein when the quantity of the PMs accumulated in the PF is at or above a predetermined first PM reference value, the quantity thereof being in accordance with the sensor-measured value, the controller concludes that the quantity of the PMs accumulated in the PF is at or above the risk level at which the damage to the PF is caused when regenerating the PF.

16. The vehicle of claim 13, wherein the changing of the regeneration period the PF includes:
   comparing the degradation condition index with a predetermined reference index value;
   counting up a number of times of excess when the degradation condition index is higher than the predetermined reference index value; and
   adjusting the quantity of the PMs accumulated in the PF according to the number of times of excess and a predetermined vehicle driving condition to increase the quantity of the PMs accumulated in the PF after counting up the number of times of excess.

* * * * *